United States Patent
Yokochi et al.

(10) Patent No.: US 7,241,488 B2
(45) Date of Patent: *Jul. 10, 2007

(54) DECORATIVE PAPER COMPRISING A YELLOW CELLULOSE-BASED SUBSTRATE

(75) Inventors: Eiichiro Yokochi, Tokyo (JP); Hajime Takeuchi, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/497,928

(22) PCT Filed: Dec. 10, 2002

(86) PCT No.: PCT/JP02/12929

§ 371 (c)(1),
(2), (4) Date: Jun. 4, 2004

(87) PCT Pub. No.: WO03/053692

PCT Pub. Date: Jul. 3, 2003

(65) Prior Publication Data

US 2004/0265569 A1    Dec. 30, 2004

(30) Foreign Application Priority Data

Dec. 10, 2001 (JP) .............................. 2001-375635

(51) Int. Cl.
*B32B 5/16* (2006.01)
*G03V 1/72* (2006.01)
(52) U.S. Cl. .................. 428/323; 430/496; 430/531
(58) Field of Classification Search ............... 430/496, 430/531; 428/323
See application file for complete search history.

(56) References Cited

U.S. PATENT DOCUMENTS

| | | | | |
|---|---|---|---|---|
| 4,196,033 A | * | 4/1980 | Arai et al. ................... | 156/196 |
| 5,296,340 A | * | 3/1994 | Tsukada et al. ............. | 430/394 |
| 5,492,733 A | * | 2/1996 | D'Anna et al. ............. | 427/517 |
| 5,942,329 A | * | 8/1999 | Nakayama et al. ...... | 428/423.1 |
| 6,558,799 B2 | * | 5/2003 | Takeuchi et al. .......... | 428/423.1 |
| 6,761,979 B2 | * | 7/2004 | Yokochi et al. ............ | 428/514 |
| 6,790,525 B2 | * | 9/2004 | Takeuchi et al. ........... | 428/339 |

FOREIGN PATENT DOCUMENTS

| | | |
|---|---|---|
| JP | 2001-303477 A | 10/2001 |
| JP | 2001-328228 A | 11/2001 |

* cited by examiner

*Primary Examiner*—H. Thi Le
(74) *Attorney, Agent, or Firm*—Timothy J. Keefer; Seyfarth Shaw LLP

(57) ABSTRACT

A decorative paper which has the yellowing be inconspicuous even if the surface resin layer comprising the cross linked coating layer of the ionizing radiation curable resin is provided on the decorative paper is provided. The decorative paper of the present invention uses a yellow base paper colored yellow or a white base paper colored white, containing a cellulose based pulp 1 and a colorant 2, as a colored base paper 3, and a surface resin layer 4 is provided thereon. More preferably, a whole solid layer is laminated between the colored base paper and the surface resin layer, wherein the whole solid layer is a yellow whole solid layer comprising a yellow ink is provided in the case that the base paper is the yellow base paper, or a white whole solid layer comprising a white ink is provided in the case that the base paper is the white base paper. Moreover, a patterned ink layer is also provided below the surface resin layer in general.

4 Claims, 4 Drawing Sheets

US 7,241,488 B2

DECORATIVE PAPER COMPRISING A YELLOW CELLULOSE-BASED SUBSTRATE

TECHNICAL FIELD

The present invention relates to a decorative paper used for a building interior material (for example, a wall), a surface material of fittings (for example, a door) or furniture, or the like. In particular, it relates to a decorative paper, capable of making the yellowing of the base paper inconspicuous.

BACKGROUND ART

Conventionally, for a decorative paper used for a building interior material (for example, a wall), a surface material of fittings (for example, a door) or furniture, or the like, the surface properties such as the wear resistance and the pollution resistance are required in general. Therefore, for example, Japanese Patent Application Publication (JP-B) No. Sho 49-31033 discloses a decorative paper, which is produced in such manner that a patterned ink layer is formed by printing on a base paper, thereafter an ionizing radiation curable resin paint of an unsaturated polyester pre-polymer is applied on the surface to form a coating layer as the outermost surface layer, and then the coating layer is cross linked and cured by an electron beam to form a surface resin layer.

In such case as described above of providing the decorative paper with the surface resin layer as the outermost layer, which is formed by cross linking a coating layer of an ionizing radiation curable resin comprising a monomer, a pre-polymer, or the like with the ionizing radiation such as an electron beam, a decorative paper having the excellent surface physical properties such as the wear resistance and the pollution resistance can be obtained owing to its high cross linkage.

The decorative paper provided with the surface resin layer as a cross linked coating layer of the ionizing radiation curable resin as mentioned above varies degree of cross linkage in the surface resin layer affected by the ionizing radiation, but it involves the problem of yellowing in any case nevertheless. In particular, the yellowing is conspicuous in the case of using the electron beam.

As to the reason for the yellowing, it was revealed that since the decorative paper uses a paper made of a cellulose based pulp as the base material (base paper), if it is irradiated with the ionizing radiation for cross linking and curing the surface resin layer, a radical (free radical) is generated by the energy (quantum) of the ionizing radiation, and triggered thereby, scission of the principal chain of the cellulose molecule is caused so as to produce a carboxyl group or a carbonyl group so that these groups have the absorption spectra in the short wavelength range of the visible light band ("Influence of the electron beam radiation on the paper quality (second edition)/novel method for providing the electron beam resistance to the paper", Japan Tappi Journal vol. 51, No. 6, published in June, 1997, page 945 to page 954).

Moreover, in the above-mentioned report, as the countermeasure for the yellowing, proposed is impregnation of the paper with an alcohol solution of an electron beam reactive monomer such as a tetraethylene glycol dimethacrylate (TEGDMA), a polyethylene glycol dimethacrylate (PEGDMA), or the like for allowing the monomer to scavenge the radical generated at the time of the electron beam irradiation, and for cross linking or graft polymerizing the monomer with a cellulose molecule at the time of the electron beam irradiation.

This method is indeed one of the effective means for prevention of the base paper yellowing at the time of the ionizing radiation irradiation.

However, since a special chemical is used for the impregnation, cost of the base paper becomes higher thus being problematic. Moreover, it is effective for prevention of the yellowing, but not complete, and the yellowing can be conspicuous depending on amount of the electron beam irradiation, or depending on the kind of the design to be printed. The yellowing becomes problematic particularly in the following two cases.

(1) The case that the design and appearance of the decorative paper inherently cannot tolerate the yellowing.

Examples include: the case of requiring a pure white appearance; the case that the change of the hue itself becomes conspicuous by the yellowing such as pale blue, red, green, or the like; and the case that the base paper loses harmony with the patterned ink layer or the balance of the color mixture by the yellowing so that the designed appearance itself is changed.

(2) The case that the base paper yellowing itself can be tolerated, but change of the hue before and after the ionizing radiation irradiation becomes the obstacle in terms of the color tone administration of the decorative paper.

For example, in general, a process of printing a patterned ink layer to the base paper and a process of coating a surface resin layer and irradiating with an ionizing radiation are executed in different processing machines. In this case, the patterned ink layer is printed by administering the color tone so as to match the color tone with the standard color immediately after the printing process. However, in the case that the yellowing is generated by the ionizing radiation in the following surface resin layer coating process, the once matched color tone becomes unmatched. Moreover, the degree of the yellowing generates irregularity depending on the irregularity of the ionizing radiation irradiation condition, the irregularity of the base paper lot, the environmental humidity, or the like. Therefore, it is very difficult that the color tone is matched preliminarily at the printing process so as to be matched with the standard color after having the yellowing at the final process.

That is, an object of the present invention is to have the yellowing of the base paper by the ionizing radiation at the time of cross linking the coating layer inconspicuous even in the case that a decorative paper is designed to have a surface resin layer made of a cross linked coating layer of an ionizing radiation curable resin.

DISCLOSURE OF THE INVENTION

A decorative paper according to the present invention comprises a yellow base paper which comprises a cellulose based pulp and a colorant and is colored yellow and a surface resin layer which comprises a cross linked coating layer of an ionizing radiation curable resin, at least the surface resin layer being laminated on the yellow base paper.

According to such design, the decorative paper of the present invention can have the yellowing inconspicuous, even if the surface resin layer comprising the cross linked coating layer of the ionizing radiation curable resin is provided on the decorative paper and the base paper causes yellowing by the ionizing radiation at the time of cross linking the coating layer to be the surface resin layer, because the yellow base paper which is colored yellow by the colorant from the beginning is used as a base paper.

Moreover, in the above-mentioned design of the decorative paper according to the present invention, a yellow whole solid layer comprising a yellow ink is laminated between the yellow base paper and the surface resin layer.

According to such design, since addition amount of the colorant in the yellow base paper can be reduced, the cost reduction and the prevention of the base paper strength deterioration due to the colorant addition can be achieved. Furthermore, since the color tone of the coloring and the degree of hiding can be ensured, the effect of having the yellowing of the base paper inconspicuous can further be improved. Moreover, the applicability and the freedom can be improved in terms of the color tone of the decorative paper and the patterning design.

Alternatively, a decorative paper according to the present invention comprises a white base paper which comprises a cellulose based pulp and is colored white and a surface resin layer which comprises a cross linked coating layer of an ionizing radiation curable resin, at least the surface resin layer being laminated on the white base paper.

According to such design, the decorative paper of the present invention can have the yellowing inconspicuous, even if the surface resin layer comprising the cross linked coating layer of the ionizing radiation curable resin is provided on the decorative paper and the base paper causes yellowing by the ionizing radiation at the time of cross linking the coating layer to be the surface resin layer, because the white base paper which is colored white by the colorant from the beginning is used as a base paper so that the yellowing appears as if it is alleviated by light scattering (degree of whiteness) owing to whiteness of the white base paper and the yellowing is also hidden by the hiding property of the white pigment. Furthermore, since the above-mentioned design in the decorative paper of the present invention has the base paper in white (namely achromatic color), compared with the case of the base paper in yellow, it has no influence on the color tone of the printed pattern so that it can cope with a pattern having any color tone, thus it is advantageous in that it can be applied in the case of a pattern or a design not allowing the yellowing.

Moreover, in the above-mentioned design of the decorative paper according to the present invention, a white whole solid layer comprising a white ink is laminated between the white base paper and the surface resin layer.

According to such design, since addition amount of the colorant in the white base paper can be reduced, the cost reduction and the prevention of the base paper strength deterioration due to the colorant addition can be achieved. Furthermore, since the color tone of the coloring and the degree of hiding can be ensured, the effect of having the yellowing of the base paper inconspicuous can further be improved. Moreover, the applicability and the freedom can be improved in terms of the color tone of the decorative paper and the patterning design.

Figure 1:
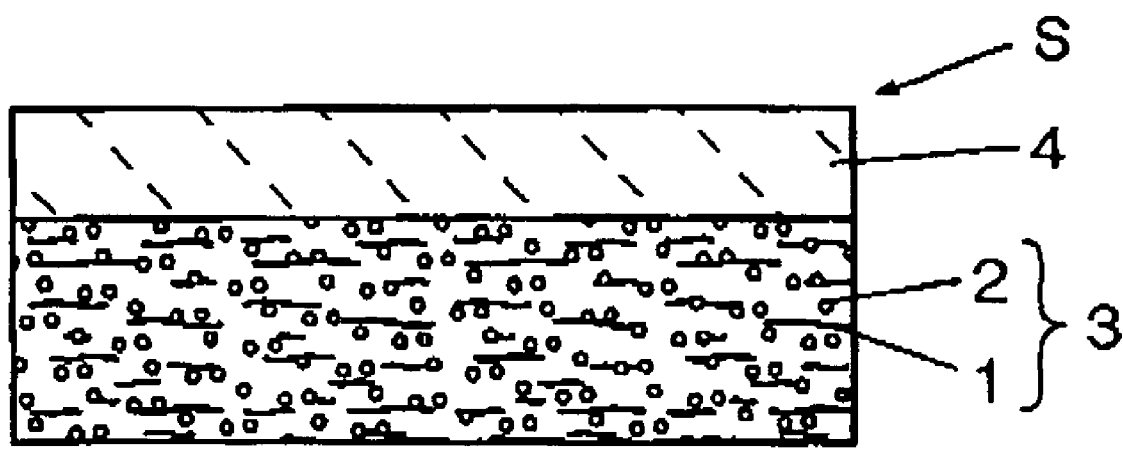
FIG. 1 is a cross sectional view showing an example of an embodiment of a decorative paper of the present invention.

The numerals in the drawings denote the followings.

Cellulose based pulp (1); colorant (yellow colorant, white colorant) (2); colored base paper (yellow base paper, white base paper) (3); surface resin layer (4); whole solid layer (yellow whole solid layer, white whole solid layer) (5); patterned ink layer (6); decorative paper (S)

BEST MODE FOR CARRYING OUT THE INVENTION

Hereinafter, with reference to the drawings, embodiments of the present invention will be explained.

[Outline]

Figure 2:
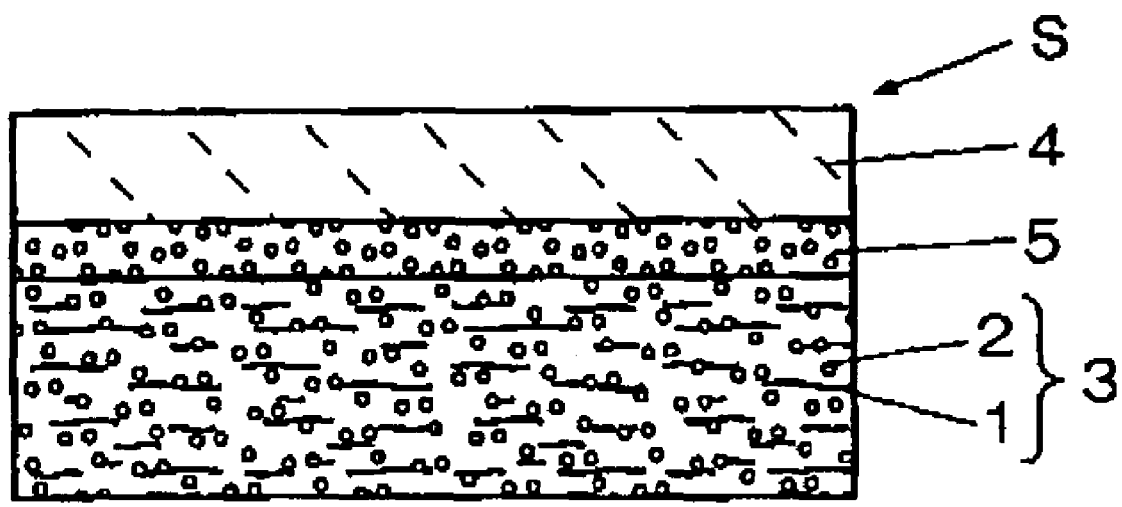
FIG. 2 is a cross sectional view showing an example of another embodiment of a decorative paper of the present invention.

As illustrated by a decorative paper S in FIG. 1 showing the cross sectional view, a decorative paper according to the present invention utilizes a yellow base paper or a white base paper as a colored base paper 3 containing a cellulose based pulp 1 and a colorant 2, on which a surface resin layer 4 comprising a cross linked coating layer of an ionizing radiation curable resin is provided. Then, more preferably, as illustrated by a decorative paper S in FIG. 2 showing the cross sectional view, the decorative paper is designed so as to dispose a colored whole solid layer 5 between the colored base paper 3 and the surface resin layer 4. The color of the whole solid layer 5 is made preferably yellow using a yellow ink in the case that the colored base paper is a yellow base paper, and it is made preferably white using a white ink in the case that the colored base paper is a white base paper.

Figure 3:
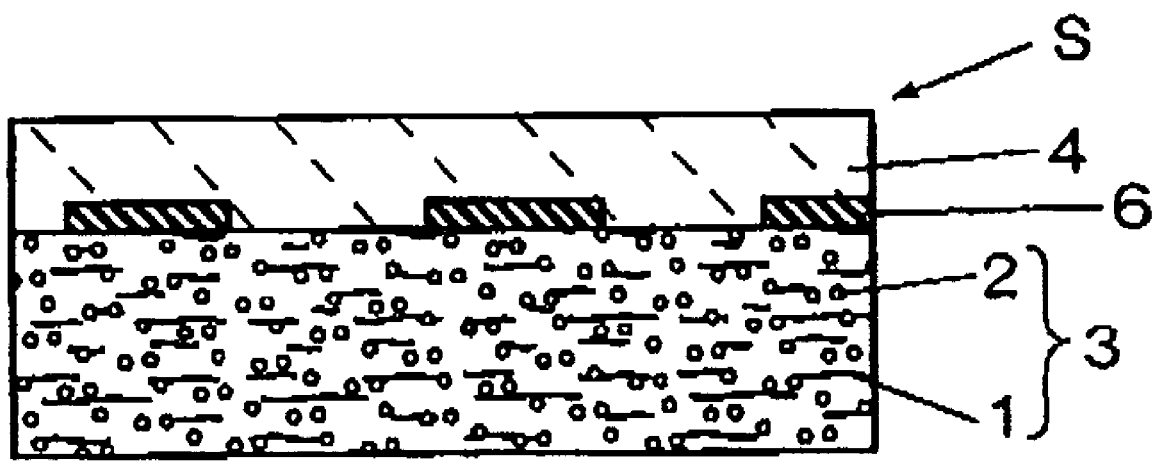
FIG. 3 is a cross sectional view showing an example of another embodiment of a decorative paper of the present invention.
Figure 4:
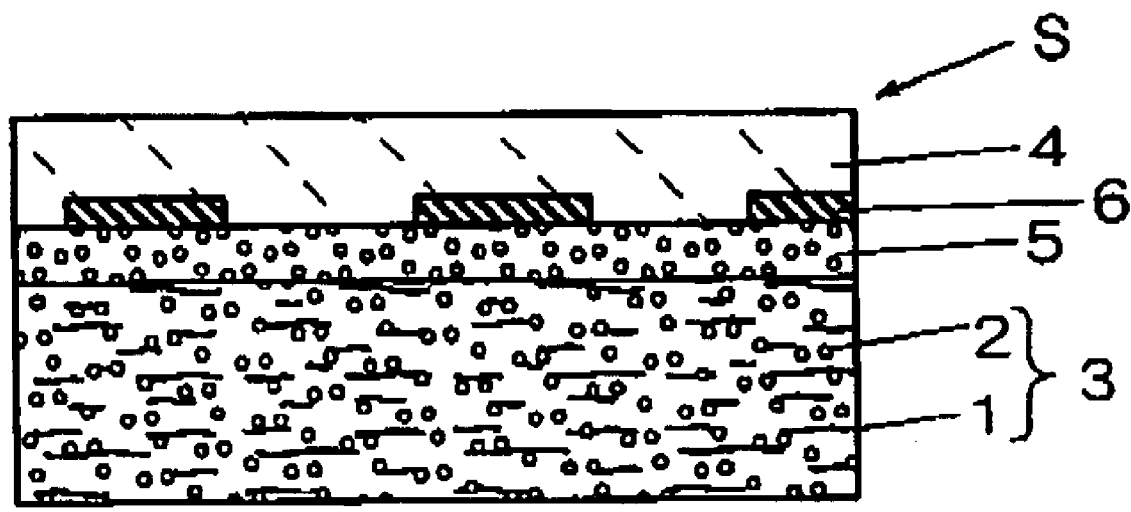
FIG. 4 is a cross sectional view showing an example of another embodiment of a decorative paper of the present invention.

Moreover, for the improvement of the design, in general, a patterned ink layer 6 is provided as in the decorative papers S illustrated in FIGS. 3 and 4. The patterned ink layer 6 is disposed between the colored base paper 3 and the surface resin layer 4. In the case that it is provided with the whole solid layer 5, as shown in FIG. 4, it is disposed between the whole solid layer 5 and the surface resin layer 4.

According to such design, even if the decorative paper of the present invention is provided with the surface resin layer comprising the cross linked coating layer of the ionizing radiation curable resin and the base paper causes yellowing when the coating layer is cross linked, the yellowing is allowed to be inconspicuous by the color of the base paper and the whole solid layer.

[Base Paper: Yellow Base Paper and White Base Paper]

IN the present invention, a yellow base paper or a white base paper is used as the base paper. The yellow base paper is a base paper containing a cellulose based pulp 1 and a colorant 2, and it colored in yellow. In contrast, the white base paper is a base paper containing a cellulose based pulp 1 and a colorant 2, and it is colored in white. According to the decorative paper of the present invention, since such a colored base paper is used, the yellowing of the cellulose based pulp (namely, transition of the hue into the yellow color) can be made inconspicuous at the time of irradiating with the ionizing radiation (it is remarkable particularly in the case of an electron beam).

In the explanation of the present invention, both the yellow base paper and the white base paper may be generally referred to the colored base paper 3.

As the cellulose based pulp 1 which is the material of the colored base paper, any of a coniferous wood (N material) pulp, a broad leaf wood (L material) pulp, and a mixture thereof may be used. As the kind of the wood for the coniferous wood (N material) pulp, a silver fir, a Japanese red pine, a fir, a hemlock, a spruce, or the like can be presented. As the kind of the wood for the broad leaf wood (L material), an oak, a beech, a birch, a eucalyptus, or the like can be presented. Although the coniferous wood pulp is inferior to the broad leaf wood pulp in terms of the printing suitability and the formation evenness, however, it is superior to the broad leaf wood pulp in terms of the pulp strength. The basis weight of the colored base paper is in general about 20 to 100 g/M$^2$.

The white base paper is a base paper produced by adding a white colorant as the colorant 2 to a base paper so as to be whitened. The white base paper alleviates the yellowing by the light scattering (degree of whiteness) due to whitened base paper itself, and it also hide the yellowing by the hiding property of the white colorant (white pigment). Since the white color is an achromatic color so as not to influence the color tone of the printed pattern on the surface, it is excellent in terms of the capability of coping with a design of any color tone.

Moreover, as to a decorative paper which has a pattern or design not tolerating the yellowing, it is not possible to adopt the method of coloring the base paper in yellow, thus the method of whitening the base paper is selected.

As the white colorant, it is preferable to select among known various kinds of white colorants those not to be deteriorated and/or not to be discolored by the ionizing radiation to be radiated. That is, an inorganic pigment is preferable as the white colorant. Specifically, one kind alone or a mixture of two more kinds of a titanium white, a lead white, an antimony white, a zinc white, a zinc sulfide, a lithopone and a basic lead sulfide can be used. In particular, the titanium white is most preferable in terms of the degree of whiteness and the hiding property.

Moreover, although the white colorant can be used alone, it may be used in combination with a colorant of another hue in a range not deteriorating the effect of having the yellowing inconspicuous. That is, the white color in the present invention may be a slightly grayish white, a white color having a slight hue (for example, a white slightly having a hue of pink, pale blue, pale green, pale yellow, or the like) in addition to the pure white.

The addition amount of the colorant in the white base paper can be determined to an appropriate amount depending on the effect of having the yellowing inconspicuous, the paper making suitability, the paper printing and processing suitability and the adjustment with respect to the cost, and it is in general about 5 to 15% by mass.

In contrast, the yellow base paper is a base paper in which the base paper itself is colored in yellowed from the beginning by adding a yellow colorant as the colorant 2 to the base paper. The yellow base paper has the above-mentioned yellowing inconspicuous owing to the yellowness of the base paper itself by having the yellowing generated by the ionizing radiation irradiation be alleviated in the original yellow color of the yellow base paper.

As the yellow colorant, it is preferable to select among known various kinds of yellow colorants those not to be deteriorated and/or not to be discolored by the ionizing radiation to be radiated. Specifically, one kind alone or a mixture of two more kinds of an inorganic pigments such as a yellow iron oxide, a yellow lead, a titanium yellow, a zinc yellow, a barium chromate and Chinese yellow, or the like, and an organic pigment such as an isoindolinone yellow, a bendizine yellow, a polyazo yellow, or the like can be used. In particular, in terms of the resistance to the ionizing radiation, the above-mentioned inorganic pigments are most preferable. Moreover, in the case of the yellow base paper, as to the colorant to be added, although the yellow colorant can be used alone, a colorant of another hue may be used in a combination in a range not deteriorating the effect of having the yellowing inconspicuous. That is, the yellow color in the present invention may be a yellow based color having the hue in the vicinity of the yellow color (for example, the color of a yellowish green, an orange, a yellowish brown, or the like) in addition to the pure yellow.

As to the coloring degree of the yellow base paper, it is preferable that the b value in the CIE 1976 (L*a*b*) color system is +6 or more. As to the coloring degree of the yellow base paper, the density is preferably made higher in order to have the yellowing accompanied by the ionizing radiation irradiation of the cellulose be conspicuous, however, the density is preferably made lower as much as possible in order to provide the applicability of the color tone and the patterning design of the decorative paper. By having the coloring degree of the yellow base paper of +6 or more in the L*a*b* color system, the color difference after the ionizing radiation irradiation can be restrained to the half or less compared with a base paper which is not colored, and thereby achieve no problematic level for practical use.

The addition amount of the colorant in the yellow base paper can be determined to an appropriate amount depending on the effect of having the yellowing inconspicuous, the papermaking suitability, the paper printing and processing suitability and the adjustment with respect to the cost, and it is in general about 5 to 15% by mass.

[Surface Resin Layer]

Next, the surface resin layer 4 is a layer to be the surface layer on the uppermost surface of the decorative layer, and it comprises a cross linked coating layer of an ionizing radiation curable resin. Since the surface resin layer has the high cross linkage, a decorative paper having the excellent surface properties such as the wear resistance and the pollution resistance can be obtained. The surface resin layer is formed as a colorless transparent layer in general.

The surface resin layer can be formed by coating a liquefied ionizing radiation curable resin (composition) by a known coating method such as gravure coating and roll coating, and cross linking the coating layer by the ionizing radiation irradiation. The surface resin layer can also be formed by whole solid printing by gravure printing, or the like. The thickness of the surface resin layer is about 1 to 30 g/m$^2$ (based on the solid component) in general in terms of the coating amount.

As to the ionizing radiation curable resin, specifically, a composition capable of being cross linked and cured by the ionizing radiation, in which a pre-polymer (including the so-called oligomer) and/or a monomer having a radical polymerizable unsaturated bond or a cation polymerizable functional group in the molecule are mixed with each other as required can be preferably used. The ionizing radiation here denotes an electromagnetic wave or a charged particle having an energy capable of polymerizing and crosslinking molecules, and it is commonly an electron beam (EB) or an ultraviolet ray (UV) in general. However, compared with the ultraviolet ray, the electron beam can easily generates the yellowing due to scission of the cellulose molecule in the base paper. Since the object of the present invention is to have the yellowing inconspicuous, it is particularly preferable for the ionizing radiation curable resin to use a resin of the type utilizing the electron beam for the cross linking.

The above-mentioned pre-polymer or monomer is specifically a compound having a radical polymerizable unsaturated group such as a (meth)acryloyl group and a (meth) acryloyl oxy group, a cation polymerizable functional group such as an epoxy group, or the like in the molecule. The pre-polymer and the monomer can be used alone or as a mixture of a plurality of kinds. Here, for example, the (meth)acryloyl group denotes an acryloyl group or a methacryloyl group. Moreover, as the ionizing radiation curable resin, a polyene/thiol based prepolymer as a combination of a polyene and a polythiol can be preferably used as well.

As the examples of a pre-polymer having a radical polymerizable unsaturated group in the molecule, a polyester (meth)acrylate, a urethane (meth)acrylate, an epoxy (meth)acrylate, a melamine (meth)acrylate, a triazine (meth) acrylate, or the like can be presented. As to the molecular weight, those having about 250 to 100,000 can be used in general. The (meth) acrylate denotes an acrylate or a methacrylate.

As the examples of a monomer having a radical polymerizable unsaturated group in the molecule, a monofunctional monomer such as a methyl (meth) acrylate, a 2-ethylhexyl (meth) acrylate, a phenoxy ethyl (meth)acrylate, or the like can be presented. Moreover, a polyfunctional monomer such as a diethylene glycol di (meth) acrylate, a propylene glycol di(meth)acrylate, a trimethylol propane tri(meth)acrylate, a trimethylol propane ethylene oxide tri(meth)acrylate, a dipentaerythritol tetra(meth)acrylate, a dipentaerythritol penta(meth)acrylate, a dipentaerythritol hexa(meth)acrylate, or the like can be presented.

As the examples of a pre-polymer having a cation polymerizable functional group in the molecule, an epoxy based resin such as a bisphenol type epoxy resin, and a novolak type epoxy compound, a pre-polymer of a vinyl ether based resin such as a fatty acid based vinyl ether and an aromatic based vinyl ether can be presented.

As the thiol, a polythiol such as a trimethylol propane trithiglycolate, a pentaerythritol tetrathioglycolate can be presented. Moreover, as the polyene, one produced by adding an allyl alcohol to both ends of a polyurethane of a diol and a diisocyanate can be presented.

In the case of cross linking by the ultraviolet ray, a photo polymerization initiating agent is added to the ionizing radiation curable resin. In the case of a resin system having a radical polymerizable unsaturated group, as the photo polymerization initiating agent, aceto phenones, benzo phenones, thioxantones, a benzoin, benzoin methyl ethers can be used alone or as a mixture. Moreover, in the case of a resin system having a cation polymerizable functional group, as the photo polymerization initiating agent, an aromatic diazonium salt, an aromatic sulfonium salt, an aromatic iodonium salt, a methalocene compound, a benzoin ester sulfonate, or the like can be used alone or as a mixture.

The addition amount of these photo polymerization initiating agents is about 0.1 to 10 parts by mass with respect to 100 parts by mass of the ionizing radiation curable resin.

To the above-mentioned ionizing radiation curable resin, various kinds of additives may further be added as needed. As the additives, there may be exemplified; a thermoplastic resin such as a vinyl chloride-vinyl acetate copolymer a vinyl acetate resin, an acrylic resin, and a cellulose based resin; an extender (filler) comprising fine particles of a calcium carbonate, a barium sulfate, an antifriction agent to be described later, or the like; a lubricating agent such as a silicone resin and a wax; a colorant such as a dye and a pigment, or the like.

The antifriction agent may be added as needed in order to further improve the wear resistance. As the antifriction agent, inorganic particles harder than the cross linked coating layer of the ionizing radiation curable resin can be used. As the material for the inorganic particles, an alumina (α-alumina, or the like), an alumino silicate, a silica, a glass, a silicon carbide, a boron nitride, a diamond, or the like can be presented. The shape of the inorganic particles is spherical, polyhedron (cube, regular octahedron, other polyhedrons, or the like), scale-like, amorphous, or the like. The average particle size of the inorganic particles is preferably about 3 to 30 μm. In the case that the average particle size is too small, the wear resistance improvement effect is deteriorated, and in the case that it is too large, the surface flatness is lowered. The addition amount of the inorganic particles is about 5 to 30% by mass with respect to the total amount of the resin component.

As the electron beam source for the ionizing radiation, various kind of electron beam accelerators such as a Cockcroft Walton type, a Van de Graaff type, a resonance potential transformer type, an insulation core potential transformer type, a straight type, a dynamitron type and a high frequency type can be used, and those to radiate electrons having an energy of 100 to 1,000 keV, preferably 200 to 300 keV are used. Moreover, as the ultraviolet ray source, light sources such as an ultra high pressure mercury lamp, a high pressure mercury lamp, a low pressure mercury lamp, a carbon arc lamp, a black light and a metal halide lamp or the like can be used. As to the wavelength of the ultraviolet ray, in general, a wavelength range of 190 to 380 nm is used mainly.

[Whole Solid Layer]

In addition to coloring of the base paper, in the case that a patterned ink layer is further present between the base paper and the surface resin layer, it is preferable to form a white whole solid layer made of a white ink or a yellow whole solid layer made of a yellow ink, as the whole solid layer 5, between the base paper and the patterned ink layer in viewpoint of the effect of having the yellowing inconspicuous. That is, the combination use of the colored base paper 3 with the whole solid layer 5 has the following advantages (1) and (2). In the explanation of the present invention, the white whole solid layer and the yellow whole solid layer may both be referred to as the whole solid layer.

As the white colorant in the above-mentioned white ink, the white colorants described for the above-mentioned white base paper can be used. Moreover, as the yellow colorant in the above-mentioned yellow ink, the yellow colorants described for the above-mentioned yellow base paper can be used. That is, at least a white colorant is added to the white whole solid layer, and at least a yellow colorant is added to the yellow whole solid layer. Moreover, as the binder resin for the above-mentioned white ink and yellow ink, known resin to be described later for the patterned ink layer can be used as needed.

The whole solid layer can be formed by whole solid printing using a yellow or white ink by a coating method such as gravure coating, roll coating, or the like or a printing method such as gravure printing or the like. The thickness of the whole solid layer is generally about 1 to 10 $g/m^2$ (based on the solid component) in terms of the coating amount.

The reasons why the whole solid layer is provided are as follows.

(1) Reduction of addition amount of the colorant in the base paper. That is, in the case that the colorant is added only to the base paper, the colorant is naturally distributed to the entirety in the thickness direction of the base paper. Then, since the thickness of the base paper is thick (about 100 μm in general), the total addition amount of the colorant finally becomes large. As a result, there may be easily caused problems such that: paper dusts is liable to generate at the time of processing; the cost gets higher; or furthermore, the strength of the base paper is deteriorated and the decorative paper is thereby liable to rupture at the time of post processing such as a process to fixing the decorative paper.

In contrast, in the case that the base paper is to be colored in appearance only by the whole solid layer without adding a colorant in the base paper, since the whole solid layer as the ink layer is thin (about 1 to 10 μm in general), if the colorant is added by an amount sufficient for having the yellowing of the base paper inconspicuous, the ink flowability and the printing suitability are deteriorated. Moreover, if the ink flowability and the printing suitability are ensured, the coloring and hiding effect becomes insufficient.

On the other hand, in the case that a colorant is added into the base paper and a whole solid layer also including a colorant is formed (laminated) on a surface of the base paper, since the addition amount in the colorant to the base paper can be reduced, cost down, prevention of the base paper strength deterioration and prevention of the paper dust generation can be achieved. Furthermore, the color tone of the coloring and the hiding degree can be ensured so that the effect of having the yellowing of the base paper inconspicuous can be sufficient.

(2) Improvement of the color tone of the base paper, the applicability and the freedom of the patterning design. That is, in the case that the colorant is added only to the base paper, a part of the pattern or the design depends on the color tone of the base paper. Therefore, the limitation to the pattern or the design by the color tone of the base paper becomes strict. Moreover, the base paper is generally made through a large lot process so that it is difficult to deal with production of large number of kinds by small lots. Therefore, it is practically difficult to finely adjust the color tone of the base paper.

On the other hand, in the case that a colorant is added into the base paper and a whole solid layer also including a colorant is formed (laminated) on a surface of the base paper, it is easy to finely adjust the color tone of the whole solid layer at the time of printing even when using one kind of a base paper, and thereby the freedom of the patterning design of the decorative paper can be widened. However, since the original purpose of the color tone fine adjustment of the whole solid layer is to having the yellowing of the base paper inconspicuous, the color tone of the whole solid layer is not to depart from the white base or yellow base.

The embodiments of the whole solid layer are as the following (A) to (D). In viewpoint of the original purpose of the present invention of realizing the above-mentioned advantages by the associative effect of the colored base paper and the whole solid layer, the embodiments (A) and (B) are most preferable. The positional relationship of the layers in the case of providing the patterned ink layer is shown at the same time.

(A) White base paper/white whole solid layer/(patterned ink layer)/surface resin layer (B) Yellow base paper/yellow whole solid layer/(patterned ink layer)/surface resin layer (C) White base paper/yellow whole solid layer/(patterned ink layer)/surface resin layer (D) Yellow base paper/white whole solid layer/(patterned ink layer)/surface resin layer

[Outline of the Other Constituent Layers]

According to the decorative paper of the present invention, in addition to the above-mentioned colored base paper, the surface resin layer, or furthermore, the whole solid layer, conventionally known other layers may optionally be provided, as needed. For example, a patterned ink layer frequently used in general can be presented. In addition thereto, a sealer layer, a primer layer, or the like can be presented.

In a case that the whole solid layer 5 is present upon providing the patterned ink layer 6, the patterned ink layer 6 is naturally provided between the whole solid layer 5 and the surface resin layer 4 (see FIG. 4). Moreover, although it is not shown in the figure, the lamination positional relationship with respect to the other layers such as a sealer layer and a primer layer generally meets the following relationship (a) or (b). Also here, the positional relationship of the layers in the case of providing the patterned ink layer is shown at the same time.

(a) Colored base paper/sealer layer/whole solid layer/(patterned ink layer)/primer layer/surface resin layer (b) Colored base paper/whole solid layer/sealer layer/(patterned ink layer)/primer layer/surface resin layer

[Patterned Ink Layer]

The patterned ink layer 6 is a layer for expressing a patterning design, or the like. It is provided in general, however, it may be omitted when not needed. Moreover, in the case of providing the patterned ink layer, the content of the patterned ink layer such as a forming method, a material, a design or the like for the patterned ink layer is not particularly limited. The patterned ink layer is generally formed using an ink by a conventionally known printing method such as gravure printing, silk screen printing, offset printing, gravure offset printing, ink jet printing, or the like.

The patterning design is for example, a wood pattern, a stone pattern, a sand pattern, a cloth pattern, a tile like pattern, a brick like pattern, a leather pattern, characters, marks, a geographic pattern, a combination of two kinds of more among them, or the like.

The ink used for forming the patterned ink layer is made of: a vehicle comprising a binder or the like; a colorant such as a pigment and a dye; and additives to be added optionally thereto such as an extender, a stabilizing agent, a plasticizing agent, a catalyst, a curing agent or the like. The binder resin may be optionally selected out of a thermoplastic resin, a thermosetting resin, an ionizing radiation curable resin or the like according to requirement such as the physical property, the printing suitability or the like. For example, a sole resin or a mixture resin containing these resin is used as a binder resin by selecting among followings: a cellulose based resin such as a nitro cellulose, a cellulose acetate and a cellulose acetate propionate; an acrylic resin such as a polymethyl (meth)acrylate, a polybutyl (meth)acrylate and a methyl (meth)acrylate-butyl (meth)acrylate-2-hydroxy ethyl (meth)acrylate copolymer; a urethane resin; a vinyl chloride-vinyl acetate copolymer; a polyester resin; an alkyd resin, or the like can be used for the binder resin. Moreover, as the colorant, an inorganic pigment such as a titanium white, a carbon black, an iron black, an iron red oxide, a yellow lead and a ultramarine, an organic pigment such as an aniline black, a quinacridone read, an isoindolinone yellow and a phthalocyanine blue, a bright pigment such as a titanium dioxide covered mica, an aluminum or another foil or the like, and other dyes.

[Sealer Layer]

The sealer layer is formed by coating a liquefied resin composition by gravure coating, roll coating or the like and solidifying the coating layer. Moreover, the sealer layer may be formed by whole solid printing by gravure printing or the like. The coating amount is about 0.5 to 10 g/m$^2$ (based on the solid component), and the base paper is impregnated with at least a part of the resin composition.

The sealer layer is formed in order to prevent the phenomenon that a liquefied surface resin layer which is coated and not cured yet is reduced in film thickness due to the absorption of the liquefied surface resin layer into the inside of the base paper, or that the formation irregularity of the base paper results in the gross irregularity of the coating layer. Moreover, the sealer layer is formed for improving the abrasion resistance by reinforcing the adhesion between the patterned ink layer and the surface resin layer.

As the material of the sealer layer, one kind or a mixture of two or more kinds of a urethane resin, an acrylic resin, a polyvinyl butylal, an epoxy resin, an amino alkyd resin or the like can be used.

As the above-mentioned urethane resin, a two liquid curing type urethane resin, an one liquid curing type (dampness curing type) urethane resin, a thermoplastic urethane resin or the like can be used.

The two liquid curing type urethane resin is an urethane resin containing a polyol as the main ingredient and an isocyanate as across linking agent (curing agent). As the polyol, those having two or more hydroxyl group in a molecule, for example, a polyethylene glycol, a polypropyleneglycol, an acrylicpolyol, a polyesterpolyol, a polyether polyol, a polycarbonate polyol, a polyurethane polyol or the like can be used. Moreover, as the isocyanate, a polyvaleic isocyanate having two or more isocyanate groups in a molecule can be sued. For example, an aromatic isocyanate such as a 2, 4-trilene diisocyanate, a xylene diisocyanate, a 4,4'-diphenyl methane diisocyanate, or an aliphatic (or alicyclic) isocyanate such as a 1,6-hexamethylene diisocyanate, an isophorone diisocyanate, a hydrogenated trilene diisocyanate, and a hydrogenated diphenyl methane diisocyanate can be used. Alternatively, an addact products or a polymer of the above-mentioned kinds of isocyanates can be used as well. For example, an addact of a trilene diisocyanate, a trimer of a trilene diisocyanate or the like can be presented.

In the above-mentioned isocyanates, the aliphatic (or alicyclic) isocyanates are preferable in viewpoint of enhancing the weather resistance and the resistance to thermal yellowing. Specifically, for example, a hexamethylene diisocyanate can be presented.

On the other hand, the one liquid curing type urethane resin is a composition containing, as the essential component, a prepolymer having an isocyanate group on the molecule end. Generally, the above-mentioned prepolymer is a prepolymer having one or more isocyanate group on both ends of the molecule. Specifically, it is a polyisocyanate prepolymer having a skeleton such as a polycarbonate skeleton, a polyurethane skeleton, a polybutadiene skeleton, a polyester skeleton or the like. The isocyanate groups react with each other by the moisture content in the air so as to generate the chain prolonging reaction. As a result, a reaction product having an urea bond in a molecule chain is generated. The isocyanate groups on the molecule ends further react with the urea bond so as to generate a biuret reaction and be branched or grafted to generate a cross linking reaction.

Moreover, as the above-mentioned acrylic resin, an acrylic resin such as a polymethyl (meth)acrylate, a polyethyl (meth)acrylate, a polybutyl (meth)acrylate, a methyl (meth)acrylate-butyl (meth)acrylate copolymer, a methyl (meth)acrylate-styrene copolymer, a methyl (meth)acrylate-butyl (meth)acrylate-(meth)acrylic acid-2-hydroxy ethyl copolymer, a methyl (meth)acrylate-butyl (meth)acrylate-(meth)acrylic acid-2-hydroxy ethyl-styrene copolymer or the like can be presented [here, the term "(meth)acrylic" is used for the meaning of acrylic or methacrylic.].

[Primer Layer]

The primer layer is formed by liquefying a resin composition by method of dissolving or the like, coating it by gravure coating, roll coating, or the like, and then solidifying the coating layer. Also, the primer layer may be formed by whole solid printing by gravure printing or the like. The purpose of the primer layer is to alleviate the shear stress generated in the interface between the surface resin layer and the patterned ink layer due to the curing and contraction upon forming the surface resin layer, and furthermore, to reinforce the adhesion between the surface resin layer and the patterned ink layer by the chemical adhesion. Moreover, as a result, the abrasion resistance can further be improved. The coating amount is about 0.1 to 5 $g/m^2$ (based on the solid component).

As the resin used for the primer layer, one kind or a mixture of two or more kinds of a urethane resin, an acrylic resin, a polyvinyl butylal or the like can be used. As the urethane resin and the acrylic resin, the resins listed for the above-mentioned sealer layer or the like can be used.

[Base Material to Be Bonded]

The decorative paper of the present invention can be used as a surface decorative material by being fixed on the surface of various base material to be bonded.

The above-mentioned base material to be bonded is not particularly limited. For example, the material of the base material to be bonded may be inorganic non metal based, metal based, wood based, plastic based or the like. Specifically, as to the inorganic non metal based ones, for example, a non pottery ceramic industry based material such as a manufactured cement, an extrusion cement, a slug cement, an ALC (light weight bubble concrete), a GRC (glass fiber reinforced concrete), a pulp cement, a wood chip cement, an asbestos cement and a calcium silicate, and an inorganic material such as an earthen ware, a pottery, a porcelain, a stone ware, a glass, a ceramic such as a porcelain enamel, or the like can be presented. Moreover, as to the metal based ones, for example, a metal material such as an iron, an aluminum and a copper can be presented. Moreover, as to the wood based ones, for example, a single plate, a plywood, a particle board, a fiber board, an integrated material, or the like made of a Japanese cryptmeria, a Japanese cypress, an oak, a lauan, a teak, or the like can be presented. Moreover, as to the plastic based ones, for example, a resin material such as a polypropylene, an ABS resin and a phenol resin can be presented.

The shape of the base material to be bonded may be optional such as a flat plate, a curved plate and a polygonal pillar.

[Application]

Moreover, although the application of the decorative paper of the present invention is not particularly limited, for example, it can be used by being fixed on the surface of the base material to be bonded as mentioned above so as to serve as a building interior material such as a wall, a ceiling or the like, a surface material for fittings such as a door, a door frame, a window frame or the like, a surface material for a fixture member such as a round rim a base board or the like, a surface material for a furniture such as a chest of drawers and a cabinet or the like.

EXAMPLES

Hereinafter, the present invention will be explained in further details with reference to the examples.

Example 1

A decorative paper whose design comprises a white base paper/a sealer layer/a patterned ink layer/a surface resin layer was produced as follows.

First, as the white base paper to be the colored base paper, a base paper of an acrylic resin latex impregnated paper of a 50 g/m² basic weight, which uses a cellulose based pulp made of an L material and contains a white pigment, as the colorant, made of a titanium white at 12% by mass with respect to the entire base paper was prepared.

Then, a sealer layer was formed on a surface to be the front side of the above-mentioned colored base paper by coating a coating liquid of a two liquid curing type urethane resin comprising 100 parts by mass of a polyester polyol and 8 parts by mass of a 1,6-hexamethylene diisocyanate on the entirety of the base paper by a gravure roll coating method so as to have 5 g/m² of coating amount (based on the solid component).

Next, a patterned ink layer expressing a grain design of a Japanese cryptmeria was formed on the sealer layer by gravure printing with the use of an ink comprising a nitro cellulose based resin as the binder resin and a color pigment as a colorant mainly composed of a carbon black and an iron red oxide.

Next, a coating layer having a 10 μm thickness was formed over the above-mentioned patterned ink layer by coating an electron beam curing type ionizing radiation resin coating liquid having the below-mentioned composition on the entirety of the base paper by a roll coating method. Then, the coating layer was irradiated with an electron beam in the irradiation condition of 175 keV, 50 kGy (5 Mrad) using a scanning type electron beam radiating device, so that the coating layer was cross linked and cured to form a colorless transparent surface resin layer formed of a cross linked coating layer, thus obtaining a desired decorative paper.

| Ionizing radiation curable resin paint | |
| --- | --- |
| Trifunctional polyester acrylate prepolymer | 60 parts by mass |
| Trimethylol propane triacrylate | 10 parts by mass |
| 1,6-hexane diol diacrylate | 29 parts by mass |
| Silicone acrylate | 1 part by mass |

The processes of the sealer layer formation, the patterned ink layer formation, the surface resin layer coating and electron beam irradiation, or the like and the color tone evaluation to be described later were all executed in the atmosphere of 23° C. and 55% RH.

Example 2

A decorative paper whose design comprises a yellow base paper/a sealer layer/a patterned ink layer/a surface resin layer was produced as follows.

In the same manner as in the example 1 except that the yellow base paper was used instead of the white base paper to be the colored base paper in the example 1, the decorative paper was produced. As the above-mentioned yellow base paper, a base paper of an acrylic resin latex impregnated paper of a 50 g/m² basic weight, which uses a cellulose based pulp made of an L material and contains a yellow pigment, as the colorant, made of a yellow iron oxide at 12% by mass with respect to the entire base paper was prepared.

Example 3

A decorative paper whose design comprises a white base paper/a white whole solid layer/a patterned ink layer/a surface resin layer was produced as follows (see FIG. 4).

In the same manner as in the example 1 except that the white whole solid layer was formed instead of the sealer layer in the example 1, the decorative paper was produced. The above-mentioned white whole solid layer was formed by coating a white ink with a slight yellow brown tinge which comprises a mixture of an acrylic resin and a nitro cellulose based resin as the binder resin and the colorant mainly composed of a titanium white in combination use of a slight amount of a benzidine yellow on the entirety of the base paper by the gravure roll coating method so as to have 4 g/m² of coating amount (based on the solid component).

Example 4

A decorative paper whose design comprises a yellow base paper/a yellow whole solid layer/a patterned ink layer/a surface resin layer was produced as follows (see FIG. 4).

The decorative paper was produced in the same manner as in the example 1 except that: the yellow base paper was used instead of the white base paper to be the colored base paper, which is a base paper of an acrylic resin latex impregnated paper of a 50 g/m² basic weight, using a cellulose based pulp made of an L material and containing a yellow pigment, as the colorant, made of a yellow iron oxide at 12% by mass with respect to the entire base paper; and, the yellow whole solid layer was formed instead of the sealer layer. The above-mentioned yellow whole solid layer was formed by coating a yellow ink with a slight brown tinge which comprises a mixture of an acrylic resin and a nitro cellulose based resin as the binder resin and the colorant mainly composed of a yellow lead in combination use with an iron oxide read on the entirety of the base paper by the gravure roll coating method so as to have 4 g/m² of coating amount (based on the solid component).

Comparative Example 1

A decorative paper whose design comprises an uncolored base paper/a sealer layer/a patterned ink layer/a surface resin layer was produced as follows.

In the same manner as in the example 1 except that the colorless base paper without adding the titanium white as the colorant was used instead of the colored base paper in the example 1, the decorative paper was produced.

Comparative Example 2

A decorative paper whose design comprises an uncolored base paper/a white whole solid layer/a patterned ink layer/a surface resin layer was produced as follows.

In the same manner as in the example 3 except that the colorless base paper without adding the titanium white as the colorant was used instead of the colored base paper in the example 3, the decorative paper was produced.

Comparative Example 3

A decorative paper whose design comprises an uncolored base paper/a yellow whole solid layer/a patterned ink layer/a surface resin layer was produced as follows.

In the same manner as in the example 4 except that the colorless base paper without adding the yellow iron oxide as the colorant was used instead of the colored base paper in the example 4, the decorative paper was produced.

[Performance Evaluation]

For the examples and the comparative examples, test pieces before coating the surface resin layer and after coating the surface resin layer and irradiating with the electron beam were arranged side by side for the comparison, and the color tone difference thereof were confirmed by the visual observation. The test pieces were compared and evaluated 1 minute after the electron beam irradiation. Moreover, the atmosphere condition at the time of the evaluation was 23° C. and 55% RH which was same as in the production processes.

TABLE 1

Performance evaluation result

| Test piece | Color examination (Evaluation by visual observation) |
|---|---|
| Example 1 | Difference unrecognized |
| Example 2 | Difference unrecognized |
| Example 3 | Difference unrecognized |
| Example 4 | Difference unrecognized |
| Comparative example 1 | The yellowing of the one after coating and irradiation was observed compared with the one before coating. |
| Comparative example 2 | The yellowing of the one after coating and irradiation was observed compared with the one before coating. However, the degree of the yellowing was slight compared with the comparative example 1. |
| Comparative example 3 | The yellowing of the one after coating and irradiation was observed compared with the one before coating. However, the degree of the yellowing was slight compared with the comparative example 1. |

As shown in the table 1, although the color tone difference was unrecognizable in the examples 1 to 4 so that the yellowing was not conspicuous, the yellowing was observed in those after coating and irradiating with the electron beam compared with those before coating the surface resin layer in the comparative examples 1 to 3.

INDUSTRIAL APPLICABILITY (1) According to the decorative paper of the present invention, in the embodiment using a yellow base paper as the base paper, even if the surface resin layer comprising the cross linked coating layer of the ionizing radiation curable resin is disposed on the decorative paper and the base paper causes yellowing by the ionizing radiation at the time of cross linking the coating layer to be the surface resin layer, the yellowing is assimilated with the original yellow color of the yellow base paper so that the yellowing can be inconspicuous.

(2) Furthermore, in the case that, in addition to the yellow base paper, a yellow whole solid layer comprising a yellow ink is laminated between the yellow base paper and the surface resin layer, addition amount of the colorant in the yellow base paper can be reduced, so that cost down, the prevention of the base paper strength deterioration due to the colorant addition, and the prevention of the paper dust generation can be achieved as well as ensuring the color tone of the coloring and the hiding degree. Moreover, the applicability and the freedom can be improved in terms of the color tone of the decorative paper and the patterning design.

(3) In contrast, according to the decorative paper using a white base paper as the base paper in the embodiment of the present invention, the decorative paper of the present invention can have the yellowing inconspicuous, even if the surface resin layer comprising the cross linked coating layer of the ionizing radiation curable resin is provided on the decorative paper and the base paper causes yellowing by the ionizing radiation at the time of cross linking the coating layer to be the surface resin layer, because the white base paper which is colored white by the colorant from the beginning is used as a base paper so that the yellowing appears as if it is alleviated by light scattering (degree of whiteness) owing to whiteness of the white base paper and the yellowing is also hidden by the hiding property of the white pigment. Furthermore, the decorative paper of the present invention has the base paper in white, compared with the case of the base paper in yellow, it has no influence on the color tone of the printed pattern so that it can cope with a pattern having any color tone, thus it is advantageous in that it can be applied in the case of a pattern or a design not allowing the yellowing.

(4) Furthermore, in the case that, in addition to the white base paper, a white whole solid layer comprising a white ink is laminated between the white base paper and the surface resin layer, addition amount of the colorant in the white base paper can be reduced, so that cost down, the prevention of the base paper strength deterioration due to the colorant addition, and the prevention of the paper dust generation can be achieved as well as ensuring the color tone of the coloring and the hiding degree. Moreover, the applicability and the freedom can be improved in terms of the color tone of the decorative paper and the patterning design.

The invention claimed is:

1. A decorative paper comprising: a yellow base paper which comprises a cellulose based pulp and a colorant and is colored yellow; a patterned ink layer for expressing a patterning design; and a surface resin layer which comprises a cross linked coating layer of an ionizing radiation curable resin, at least the surface resin layer being laminated on the yellow base paper so as to cover the patterned ink layer formed on the yellow base paper, wherein b value of the yellow base paper is +6 or more.

2. The decorative paper according to claim 1, wherein a yellow whole solid layer comprising a yellow ink is laminated between the yellow base paper and the surface resin layer so that the patterned ink layer exists between the yellow whole solid layer and the surface resin layer.

3. The decorative paper according to claim 2, wherein the whole solid layer has a thickness of from about 1 to about 10 μm.

4. The decorative paper according to claim 1, wherein the colorant is selected from a yellow iron oxide, a yellow lead, a titanium yellow, a zinc yellow, a barium chromate and Chinese yellow, an isoindolinone yellow, a bendizine yellow and a polyazo yellow.

* * * * *